(12) United States Patent
Ohmi et al.

(10) Patent No.: US 6,818,320 B2
(45) Date of Patent: Nov. 16, 2004

(54) WELDING METHOD FOR WELDED MEMBERS SUBJECTED TO FLUORIDE PASSIVATION TREATMENT, FLUORIDE PASSIVATION RETREATMENT METHOD, AND WELDED PARTS

(75) Inventors: Tadahiro Ohmi, 1-17-301, Komegabukuro 2-chome, Aoba-ku, Sendai, Miyagi-ken (JP), 980-0813; Takahisa Nitta, Tokyo (JP); Yasuyuki Shirai, Miyagi-ken (JP); Osamu Nakamura, Miyagi-ken (JP)

(73) Assignees: Tadahiro Ohmi, Miyagi-ken (JP); Stella Chemifa Kabushiki Kaisha, Osaka (JP)

( * ) Notice: Subject to any disclaimer, the term of this patent is extended or adjusted under 35 U.S.C. 154(b) by 210 days.

(21) Appl. No.: 09/748,883

(22) Filed: Dec. 27, 2000

(65) Prior Publication Data

US 2001/0023888 A1 Sep. 27, 2001

Related U.S. Application Data

(62) Division of application No. 09/130,583, filed on Aug. 7, 1998.

(30) Foreign Application Priority Data

Aug. 8, 1997 (JP) .............................................. 9-227121
Nov. 7, 1997 (JP) .............................................. 9-322361

(51) Int. Cl.[7] ......................... B21D 39/00; B32B 15/00; C25D 5/10
(52) U.S. Cl. ......................... 428/621; 428/685; 428/457
(58) Field of Search ................................. 428/621, 632, 428/685, 610, 457; 148/283, 524, 529, 537, 519, 284, 516; 228/119, 203, 262.1

(56) References Cited

U.S. PATENT DOCUMENTS

| 4,026,737 A | 5/1977 | Takahari et al. |
| 4,851,636 A | 7/1989 | Sugimoto et al. |
| 4,975,335 A | 12/1990 | Wan |
| 5,224,998 A | 7/1993 | Ohmi et al. |
| 5,226,968 A | 7/1993 | Ohmi et al. |
| 5,241,987 A | 9/1993 | Ohmi et al. |
| 5,344,494 A | 9/1994 | Davidson et al. |
| 5,396,039 A | 3/1995 | Chevrel et al. |
| 5,407,492 A | 4/1995 | Ohmi et al. |
| 5,569,334 A | 10/1996 | Kawata et al. |
| 5,597,109 A | 1/1997 | Ohmi et al. |
| 5,604,040 A | 2/1997 | Sugama |
| 5,720,824 A | 2/1998 | Bronson et al. |
| 5,746,841 A | 5/1998 | Koike et al. |
| 5,789,086 A | 8/1998 | Ohmi |
| 5,880,032 A | 3/1999 | Doi et al. |
| 5,906,688 A | 5/1999 | Ohmi |
| 5,916,457 A | 6/1999 | Ohmi |
| 5,977,516 A | 11/1999 | Ohmi |

FOREIGN PATENT DOCUMENTS

| JP | 2/43352 A | 2/1990 | ............ C23C/4/06 |
| JP | 2/54751 A | 2/1990 | ............ C23C/8/18 |
| JP | 2/85358 A | 3/1990 | ........... C23C/14/22 |
| JP | 2/270964 A | 11/1990 | ........... C23C/16/14 |
| JP | 6/39543 A | 2/1994 | ........... B23K/9/035 |
| JP | 6/41629 A | 2/1994 | ............ C21D/1/76 |
| JP | 6/87093 A | 3/1994 | ........... B23K/37/00 |
| JP | 6/11632 A | 4/1994 | ............ C21D/1/76 |
| JP | 6/106348 A | 4/1994 | ............ B23K/9/08 |
| JP | 6/109200 A | 4/1994 | ............. F17D/1/04 |
| JP | 6/142932 A | 5/1994 | ............ B23K/9/16 |
| JP | 6/182558 A | 7/1994 | ............ B23K/9/32 |
| JP | 6/210483 A | 8/1994 | ............ B23K/31/00 |
| JP | 06328256 A | 11/1994 | ............ B23K/9/29 |
| JP | 06335777 A | 12/1994 | ............ B23K/9/29 |
| JP | 07060446 A | 3/1995 | ............ B23K/9/16 |
| JP | 07060476 A | 3/1995 | ............ B23K/33/00 |
| JP | 07151272 A | 6/1995 | ............. F16L/9/02 |
| JP | 08168896 A | 7/1995 | .......... B23K/37/053 |
| JP | 07197206 A | 8/1995 | ............ C22C/38/00 |
| JP | 07197207 A | 8/1995 | ............ C22C/38/00 |
| JP | 07201812 A | 8/1995 | ....... H01L/21/3065 |
| JP | 07233476 A | 9/1995 | ........... C23C/16/40 |
| JP | 07252631 A | 10/1995 | ............ C23C/8/18 |
| JP | 07323374 A | 12/1995 | ............ B23K/9/23 |
| JP | 08182622 A | 7/1996 | ............ A47J/37/06 |
| JP | 09078221 A | 3/1997 | ............ C23C/8/12 |

Primary Examiner—Kiley Stoner
Assistant Examiner—Colleen P. Cooke
(74) Attorney, Agent, or Firm—Randall J. Knuth (57) ABSTRACT

A welding method for materials to be welded which are subjected to fluoride passivation treatment, and a fluoride passivation retreatment method, wherein, when fluoride passivation retreatment is conducted after welding, there is no generation of particles or dust. The method provides superior resistance to fluorine system gases. During fluoride passivation treatment, hydrogen is added to the gas (the back shield gas) flowing through the materials to be welded. In one embodiment of the welding method, the thickness of the fluoride passivated film in a predetermined range from the butt end surfaces of the materials to be welded is set to 10 nm or less, followed by subsequent welding. Furthermore, the fluoride passivation retreatment method, includes the steps of heating at least the welded parts following welding and flowing a gas containing fluorine gas in the interior portion of the parts.

8 Claims, 13 Drawing Sheets

WELDED PART

5mm   UPSTREAM

DOWNSTREAM

[BACK SHIELD GAS : 100 % Ar]

Fig. 3

PARTICLE MEASUREMENTS AT WELDED PARTS

AT WELDING CONDITIONS (30rpm × 1rev. BEAD WIDTH 1mm) 9 WELDED SPOTS

FLOW RATE: 0.1cf/min (U-$N_2$), PARTICLE MEASUREMENT: 0.1 μm OR LARGER

| BASE METAL | NO WELDING | STAINLESS STEEL TUBU SUBJECTED TO FLUCRIED PASSIVATION TREATMENT | | | | REGULAR STAINLESS STEEL |
|---|---|---|---|---|---|---|
| | | CONVENTIONAL WELDING METHOD | WELDING AFTER FILM REMOVAL WITH HOT WATER (80°C) | WELDING AFTER FILM REMOVAL WITH 0.5%HF/10%$H_2O_2$ | WELDING METHOD WITH 5% ADDED $H_2$ | CONVENTIONAL WELDING METHOD |
| NO HAMMERING (10min) | 0 | 0 | 0 | 0 | 0 | 0 |
| WITH HAMMERING (10min) | 0 | 60 | 0 | 0 | 0 | 0 |

DOWNSTREAM

5mm

3mm

3mm

WELDED PART

5mm  UPSTREAM

[BACK SHIELD GAS : 5% $H_2$/Ar]

REMOVAL OF FLUORIDE PASSIVATED
FILM USING HOT WATER (80°C)

(a) IMMERSION FOR 5 MINUTES (b) IMMERSION FOR 10 MINUTES

REMOVAL OF PASSIVATED FILM USIMG A MIXED
AQUEOUS SOLUTION OF 0.5% HYDROFLUORIC
ACID AND 10% HYDROGEN PEROXIDE (b) PRIOR TO FILM REMOVAL (b) IMMERSION FOR 10 MINUTES

WELDED PART

DOWNSTREAM

3mm

5mm   UPSTREAM

[BACK SHIELD GAS : 0.5% $H_2$/Ar]

WELDING METHOD FOR WELDED MEMBERS SUBJECTED TO FLUORIDE PASSIVATION TREATMENT, FLUORIDE PASSIVATION RETREATMENT METHOD, AND WELDED PARTS

This case is a divisional of co-pending U.S. patent application Ser. No. 09/130,583 filed on Aug. 7, 1998.

BACKGROUND OF THE INVENTION AND DESCRIPTION OF RELATED ART

1. Technical Field

The present invention relates to a welding method for welded members subjected to fluoride passivation treatment, to a fluoride passivation retreatment method, and to welded products.

2. Background Art

In, for example, semiconductor manufacturing lines, because a fluorine system gas is supplied in a stable manner over a long period of time in a fluorine system gas supply line (chiefly, in fluorine system gas supply lines for excimer laser steppers), a fluoride passivated film is formed on the inner surfaces of the piping parts which comprise the fluorine gas supply system.

Figure 3:
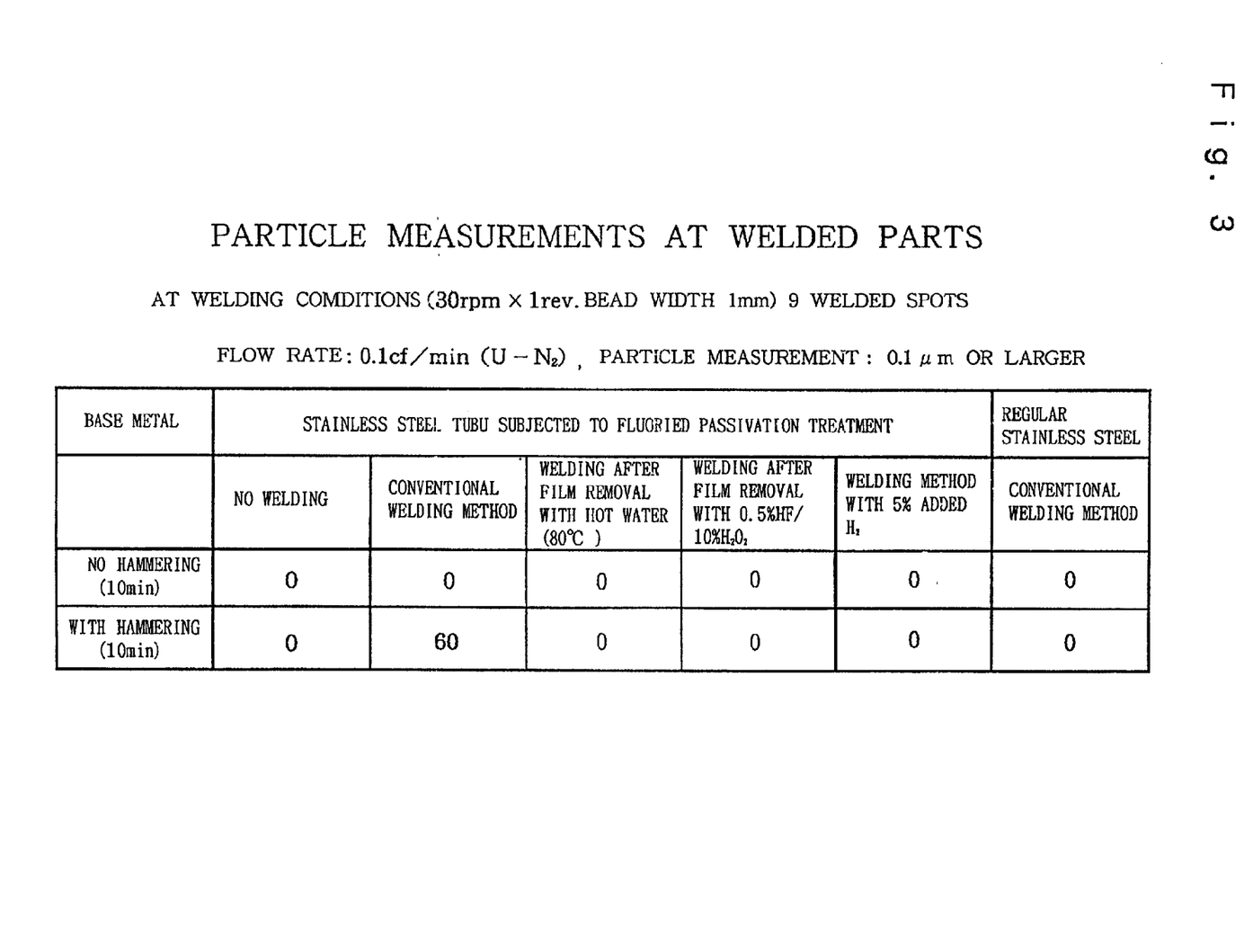
FIG. 3 is a diagram showing the results of the measurement of particles in various welding samples in accordance with the present invention.

When members to be welded (for example, piping, valves, and the like) which are subjected to fluoride passivation treatment are welded together to produce a fluorine gas supply line, it has been discovered that the gas which is supplied from this fluorine gas supply line becomes contaminated with particles and dust (FIG. 3).

When members to be welded which have fluoride passivated films formed thereon are welded, the fluoride passivated film disappears in the welded part.

For this reason, there are occasions on which the durability with respect to fluorine system gases (chiefly, fluorine and hydrogen fluoride) worsens.

Thus, the reformation of a fluoride passivated film is conducted.

However, when welding has been conducted, even if a fluoride passivated film is again formed, the gas which is supplied from the fluorine gas supply line constructed using such welded members is contaminated by particles and dust. Furthermore, it is not always the case that the decline in durability with respect to fluorine system gases can be overcome.

OBJECT AND SUMMARY OF THE INVENTION

The present invention has as an object thereof to provide a welding method for members to be welded which are subjected to fluoride passivation treatment, and a fluoride passivation retreatment method, which involve no generation of particles or dust, and which provide superior resistance with respect to fluorine system gases, when fluoride passivation retreatment is conducted after welding.

In the welding method for members lo be welded which are subjected to fluoride passivation treatment in accordance with the present invention, when the members to be welded, which comprise stainless steel subjected to fluoride passivation treatment, are welded, hydrogen is added to the gas (the back shield gas) which flows through the members to be welded.

In the welding method for members to be welded which are subjected to fluoride passivation treatment in accordance with the present invention, the thickness of the fluoride passivated film in a predetermined range from the butt end surfaces of the members to be welded, which comprise stainless steel subjected to fluoride passivation treatment, is set to 10 nm or less, and welding is conducted.

Furthermore, in the fluoride passivation retreatment method in accordance with the present invention, after conducting the welding method described above, at least the welded portion is heated, and a gas containing fluorine gas is caused to flow in the interior.

The present inventors have assiduously searched for the cause of the generation of particles and dust even when fluoride passivation retreatment is conducted, and for the reason that the decline in resistance to fluorine system gases cannot be overcome.

Figure 1:
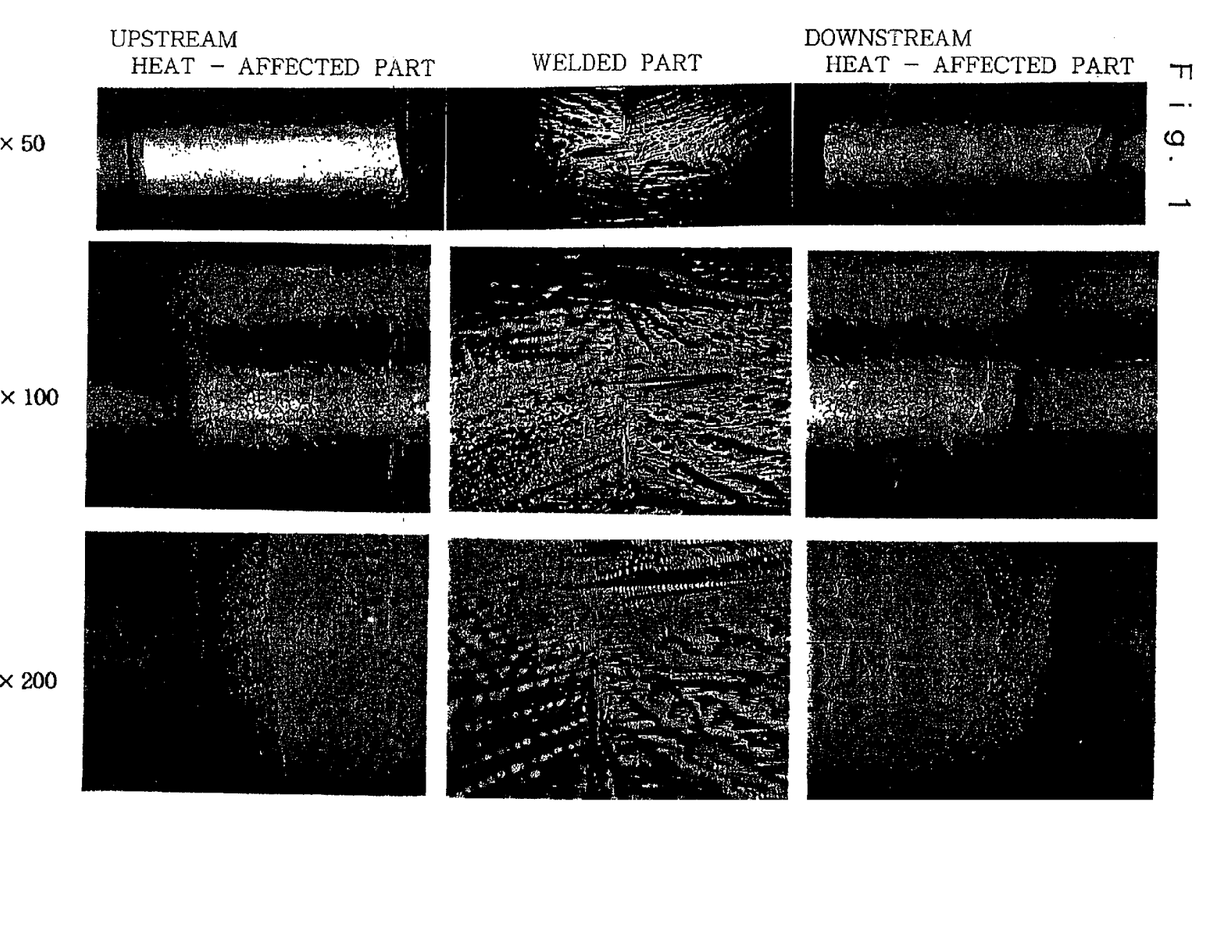
FIG. 1 is a diagram showing an observation of the vicinity of the welded part, using an optical microscope, when the welding of piping subjected to fluoride passivation treatment is conducted using a conventional welding method.
Figure 2:
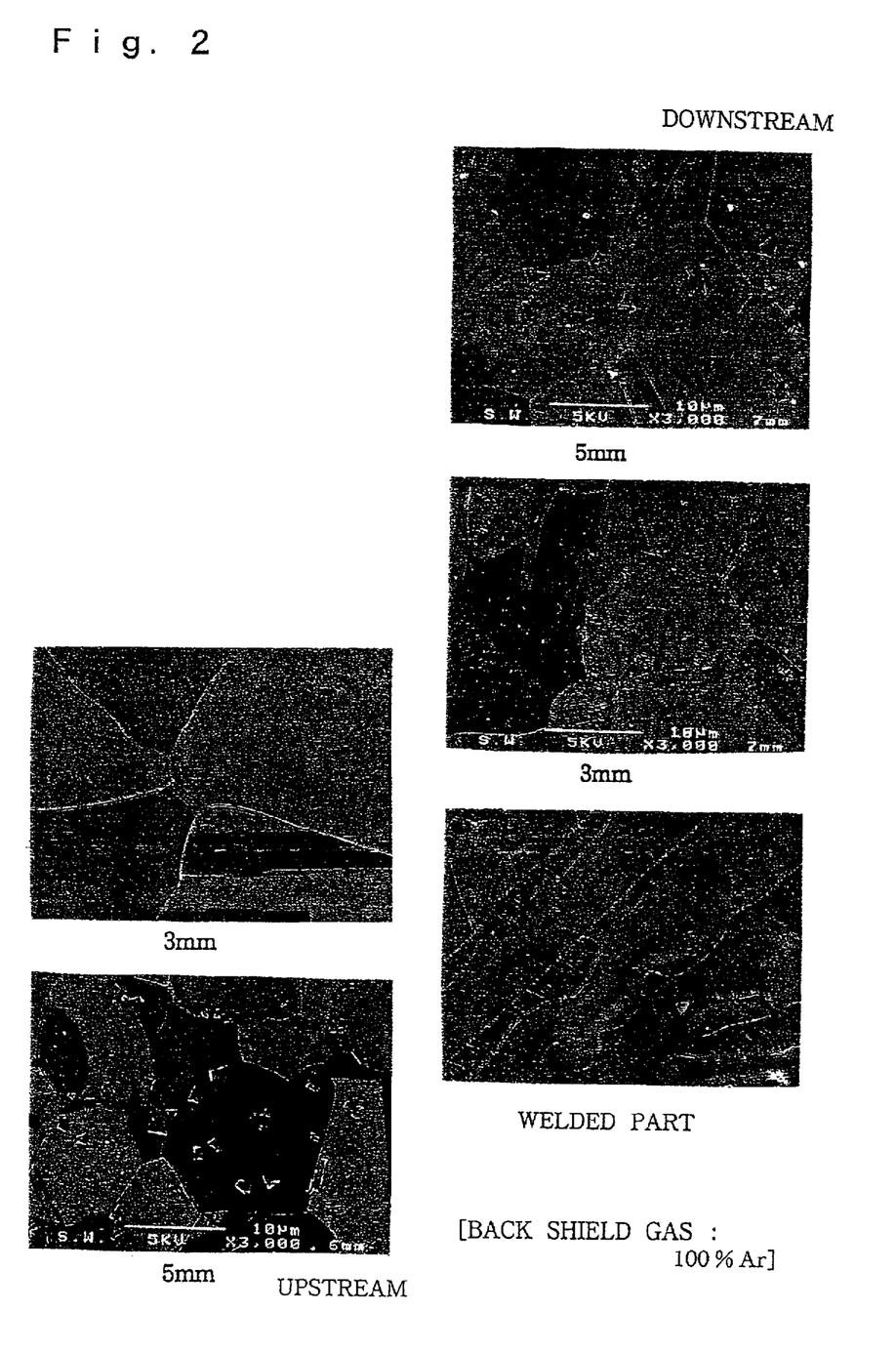
FIG. 2 is a diagrams showing an observation of the vicinity of the welded part, using scanning electron microscopy, when the welding of piping subjected to fluoride passivation treatment is conducted using a conventional welding method.

The following points have been learned. These are that: (1) the inner surfaces of the members to be welded become rough in the vicinity of the welded part (FIG. 1); (2) crystals of fluorides of iron and chromium are deposited (FIG. 2); and (3) the fluoride passivated film melts during welding, fumes are generated-from-this fluoride passivated-film, and the fumes themselves become particles and dust and are deposited on the inner surfaces of the welded members.

It is assumed that (1), (2), and (3) above are sources of contamination of the gas which flows through the fluoride gas supply lines constructed by welding.

First, the present inventors assiduously looked for a welding method which made it possible to prevent roughness of the inner surface, and which did not involve the generation of deposits.

As a result, it was discovered that, during welding, by adding hydrogen to the gas (the back shield gas) flowing in the members to be welded, it was possible to prevent the occurrence of roughness on the inner surface, and to prevent the generation of deposits, and it was also possible to prevent the generation of fumes and to prevent their deposition onto the inner surface of the welded members; the present invention was arrived at on the basis of this discovery.

Furthermore, it was discovered that if, prior to conducting welding, the thickness of the fluoride passivated film within a range of at least 5 mm from the butt end surfaces of members to be welded comprising stainless steel subjected to fluoride passivation treatment was set to a level of 10 nm or less, it was possible to prevent the occurrence of roughness of the inner surface, and to prevent the generation of deposits.

Additionally, it was confirmed that if fluoride passivation retreatment was conducted after conducting such welding, there was no mixture of particles or dust into the gas, and furthermore, it was possible to restore resistance to fluorine system gasses.

In the present invention, the concentration of hydrogen in the back shield gas described above is preferably within a range of 0.1–20%, more preferably within a range of 1%–20%, still more preferably within a range of 3%–10%, and most preferably within a range of 5%–10%.

At concentrations of less than 1%, there are cases in which there are remaining deposits. At levels of 5% or more, the deposits completely disappear. When the concentration is in excess of 20%, the effects are saturated. Accordingly, the concentration is preferably 20% or less for the purposes of economy.

Use of a noble gas, particularly argon gas, is preferable as the back shield gas. It is possible to employ other gases (for example, helium gas).

The flow rate of the back shield gas described above is preferably 6 L/min or more, and the upper limit thereof is preferably 10 L/min. By setting the flow rate to 6 L/min or more, the metal gases (metal fumes) generated during welding are no longer deposited on the inner surfaces of the welded members or the pipes, and it is possible to effectively prevent the contamination of the interior of the piping. However, if the flow rate is in excess of 10 L/min, the effects of preventing fume deposition are saturated, so that the flow rate is preferably within a range of 6 L/min to 10 L/min.

In the welding method of the present invention, when the removal of the fluoride passivated film is conducted prior to welding, it is preferable that the complete removal of the fluoride passivated film be conducted; however, even if approximately 10 nm thereof remains, it is possible to suppress the generation of deposits and the occurrence of surface roughness, so that removal may be conducted to a level of 10 nm or less.

The welding bead width during welding is preferably 4 mm or less, and a width of 2 mm or less is more preferable, and such bead widths are preferably adopted in the welding method of the present invention.

It is necessary to prevent the occurrence of surface roughness and the generation of deposits at those parts affected by heat, as well, so that it is preferable that the area from which the fluoride passivated film is removed be 5 mm or more from the butt end surfaces. In removing the fluoride passivated film, it is possible to employ a method in which the predetermined range from the butt end surfaces of the members to be welded is immersed in, for example, hot water, or to employ a method in which immersion is conducted in an aqueous solution containing hydrofluoric acid and hydrogen peroxide.

At this time, it is preferable that the temperature of the aqueous solution be within a range of 60–90° C., and a range of 80–90° C. is more preferable. At temperatures less than 60° C., the removal requires a large amount of time, while if the temperature is in excess of 90° C., it becomes difficult to control the amount removed. Furthermore, there are cases in which the surface becomes rough after removal. Since the welded part becomes molten as a result of the welding, this roughness has no effect; however, the roughness of the part affected by the heat is, of course, a source of particle and dust generation.

With respect to the period of immersion in the aqueous solution, a period of 5 minutes or more is preferable, and the upper limit is preferably 10 minutes. This is dependent on the temperature of the aqueous solution; however, if the period is in excess of 10 minutes, the fluoride passivated film may be completely removed, and once complete removal has occurred, the surface of the stainless steel which comprises the base metal is exposed, and an oxide film may be formed on the surface of the base metal. When fluoride passivation retreatment is conducted, at the parts affected by heat, a fluoride passivated film is formed on the oxide film, and there are cases in which a fluoride passivated film which is essentially in accordance with stoichiometric ratios is not formed.

Accordingly, when the removal of the fluoride passivated film by means of immersion in an aqueous solution is conducted, it is preferable that the fluoride passivated film remain in a thickness of approximately 10 nm.

It is preferable that the fluoride passivated film, which is formed on the members to be welded prior to welding, be formed as described below. The surface is first rendered in a mirrored state by means of conducting electropolishing or composite electropolishing of the surface, and then, in order to remove the moisture deposited on or adsorbed to the surface, heating (baking) is conducted for a period of approximately 10 hours at a temperature of approximately 250° C. in a 100% nitrogen gas atmosphere (having a moisture concentration of 10 ppb or less, and more preferably 10 ppt or less). After backing, heating is conducted for a period of approximately 3 hours at a temperature of approximately 150° C. in a gas containing approximately 1% fluorine (fluorine diluted with nitrogen). After this, heating is conducted for a period of approximately 10 hours at a temperature of approximately 250° C. in a 100% nitrogen gas atmosphere identical to that described above. By means of such treatment, the fluorine deposited on the surface is either completely bonded to the steel or is removed, and it possible to form a fluoride passivated film essentially in accordance with stoichiometric ratios. Such a fluoride passivated film exhibits superior resistance to fluoride system gases (for example, HF gas, and $WF_6$ gas).

Furthermore, the fluoride passivation retreatment which is conducted after welding may be conducted in a manner similar to that of the fluoride passivation treatment. However, in the case of the fluoride passivation retreatment, in order to avoid the effects of heat on the fluoride passivated film formed, it is preferable that only the welded part, or the welded part and the part affected by heat during wielding, be heated.

In accordance with the present invention, a welding method is provided for members to be welded such as pipes and the like which are employed in piping systems in, for example, semiconductor manufacturing lines, in which, in the welding of pipes and members to be welded which are subjected to fluoride passivation treatment, there is no inner surface roughness or deposits, fluoride passivation retreatment is conducted after welding, and there is superior resistance to fluorine system gases.

BRIEF DESCRIPTION OF THE DIAGRAMS

DESCRIPTION OF THE REFERENCES

401 welding head,
402 welding electrode,
403 pipe,
404 silicon wafer,
405 back shield gas flow direction.

BEST MODE FOR CARRYING OUT THE INVENTION

Hereinbelow, a welding method for pipes and members to be welded subjected to fluoride passivation treatment, and fluoride passivation retreatment technology, in accordance with the present invention will be explained with reference to the figures. The present invention is not necessarily limited to the embodiments described.

The welding in the present embodiments was conducted using a welding power source (SPB-100-T4) and welding apparatus (K8752T) produced by Astro Arc. Co. The bead width was set at approximately 2 mm.

Embodiment 1

An austenitic stainless steel tube having a length of 12 cm and a diameter of ¼ inch was prepared.

The inner surface of this tube was subjected to electropolishing, and the surface roughness thereof was set to an Rmax of 0.7 micrometers. After electropolishing, this was maintained for a period of 10 hours at a temperature of 250° C. in an atmosphere of 100% nitrogen gas having a moisture concentration of 10 ppb or less.

Next, this was maintained at a temperature of 150° C. for a period of 3 hours in an atmosphere of 1% fluorine gas in nitrogen gas to produce a fluoride passivated film.

Subsequently, treatment was conducted for a period of 10 hours at 200° C. in a 100% nitrogen gas atmosphere having a moisture concentration of 10 ppb or less.

As a result of the treatment described above, a fluoride passivated film having a thickness of approximately 20 nm was formed on the inner surface.

Figure 4:
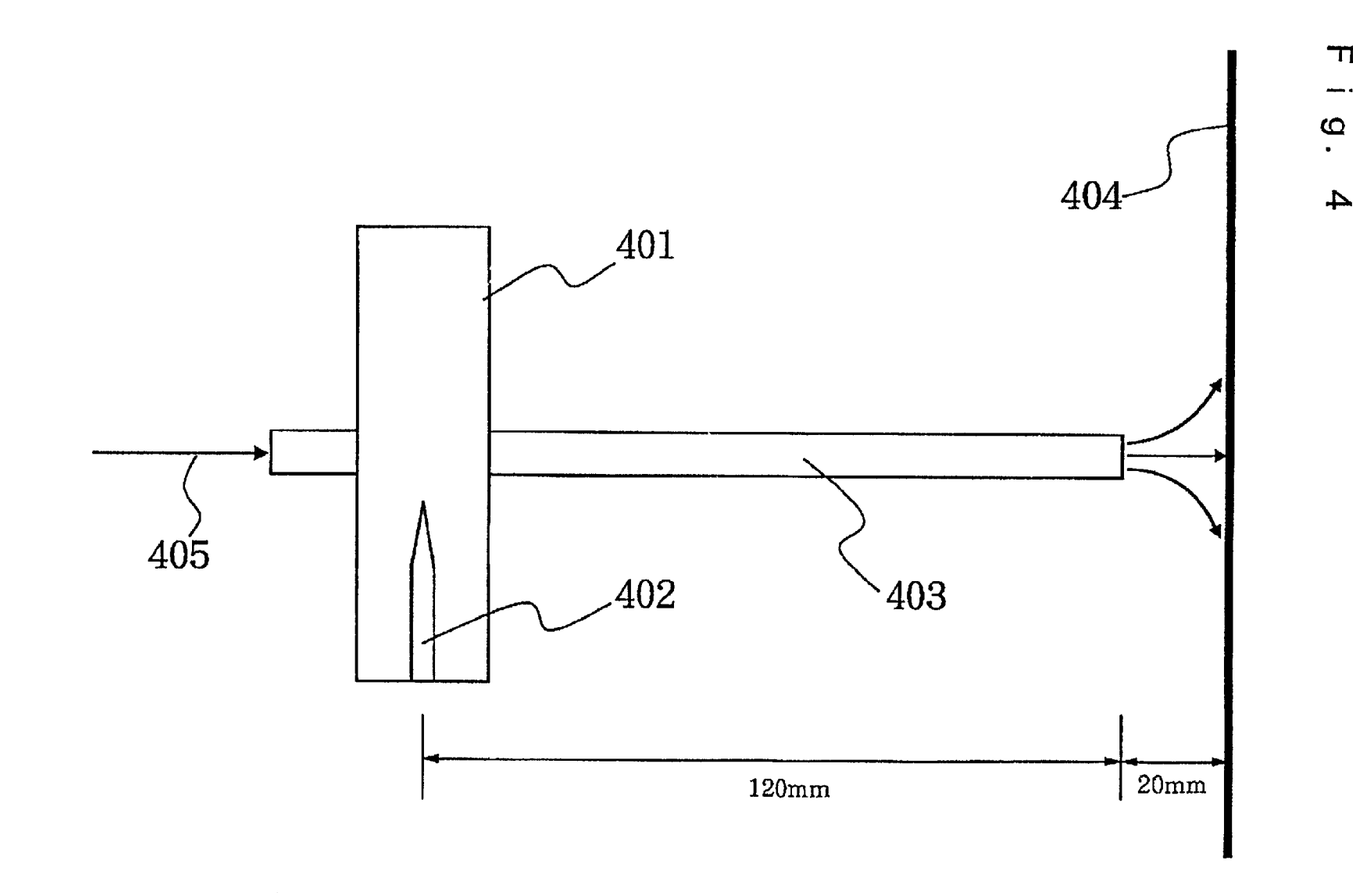
FIG. 4 is a diagram showing an experimental system in which metal generated during the welding of piping subjected to fluoride passivation treatment is sprayed onto silicon wafers.

This piping was subjected to butt welding at a welding rotational speed of 30 rpm, and at positions separated by 2 cm from the welded pipe (14 cm from the welded parts), a back shield gas was sprayed on silicon wafers (at 6 L/min) (FIG. 4).

At this time, the hydrogen concentration in the back shield gas was altered as shown in Table 1. Using the TREX 610 produced by the TECNOS Corp., an assessment was conducted of the amount of metallic contaminants during welding using total reflection fluorescent X-ray spectroscopy, and the results thereof are shown in Table 1.

TABLE 1

| Amount of | Hydrogen Concentration | | | | | Standard Welding Hydrogen Concentration |
|---|---|---|---|---|---|---|
| Metal | 0% | 1% | 3% | 5% | 10% | 5% |
| Fe | 128.5 | 106.5 | 76.3 | 52.2 | 28.6 | 15.4 |
| Cr | 21.7 | 20.7 | 20.8 | 11.9 | 15.6 | 21.1 |
| Ni | 0.1 | 0.2 | 0.8 | 0.4 | 0.4 | 0.6 |
| Mn | 2.6 | 2.5 | 2.1 | 2.1 | 1.7 | 2.4 |

(The units are $\times 10^{10}$ atom/cm$^2$)

In Table 1, the sample indicated by "standard welding hydrogen concentration 5%" was a welding member in the electropolished state on which no fluoride passivated film had been formed.

It can be seen from Table 1 that in the state in which hydrogen was not added, in comparison with standard welding (employing austenitic stainless steel tubing which was subjected to electropolishing), where the amount of metallic contaminants was approximately 10 times higher, by means of increasing the amount of added hydrogen, these contaminant levels reached levels essentially similar to those of standard welding.

However, this effect becomes saturated when levels of 5% or more are added, and from the point of view of economy, it is assumed that an amount of added hydrogen within a range of 5%–10% is optimal.

Figure 5:
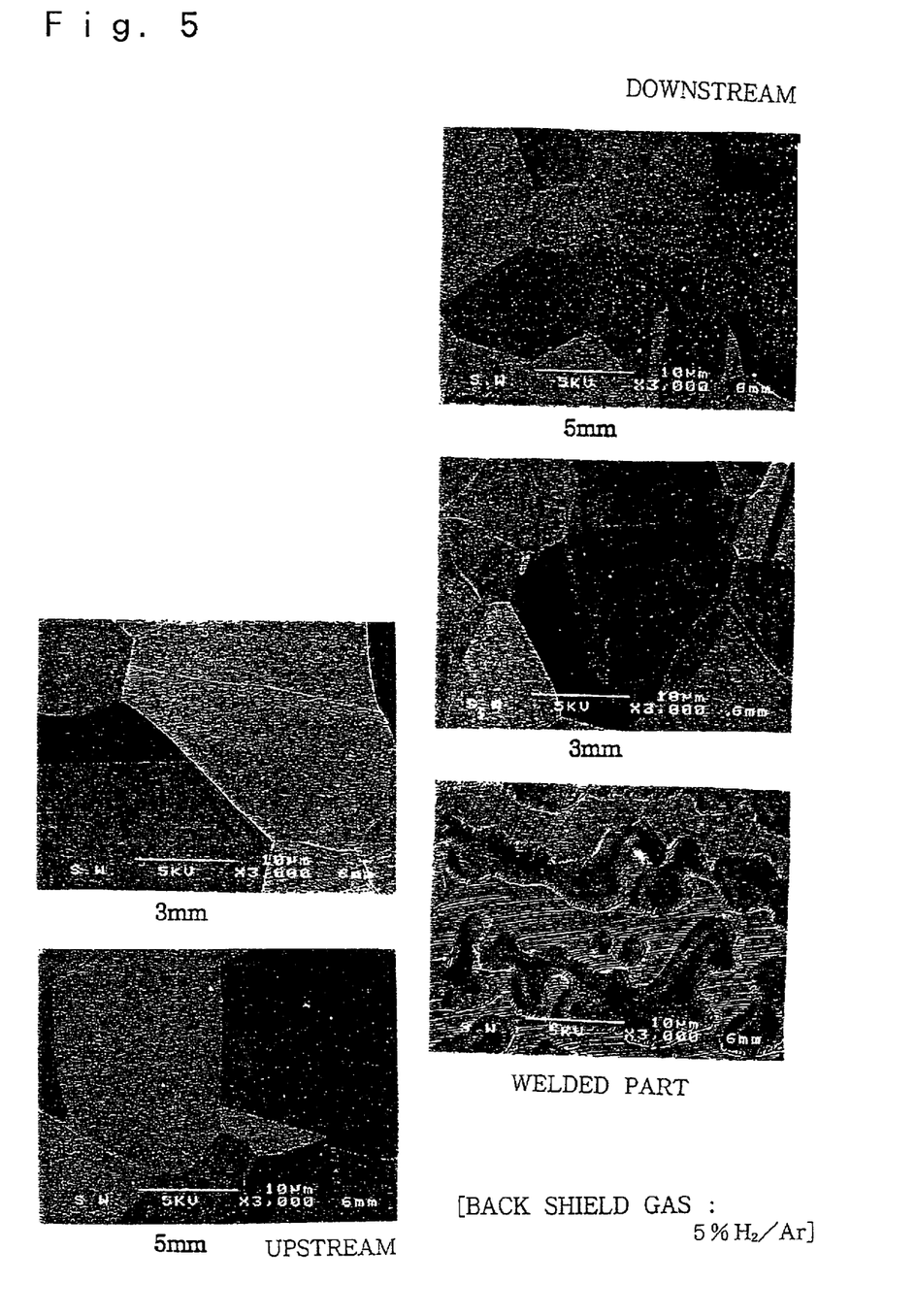
FIG. 5 is a diagram showing an observation of the vicinity of the welded part, using scanning electron microscopy, when the welding of piping subjected to fluoride passivation treatment is conducted with the addition of 5% hydrogen.

Furthermore, when an observation of the vicinity of the welded part was conducted using scanning electron microscopy after welding, almost no deposited material was observed as a result of the addition of 5% or more of hydrogen (FIG. 5). Furthermore, there was no surface roughness.

After welding, fluoride passivation retreatment was conducted under conditions identical to those of the formation of the initial fluoride passivated film, and when the generation of particles and dust was assessed, no particles or dust could be detected.

Furthermore, when 20% or 30% of hydrogen was added, the results obtained were identical to those obtained when 10% of hydrogen was added.

Embodiment 2

Experimentation identical to that of embodiment 1 was conducted, and the results obtained when the flow rate of the back shield gas was altered (the hydrogen concentration was 5%) are shown in Table 2.

TABLE 2

| Amount of | Back Shield Gas Flow rate | | | | | Standard Welding Flow Rate |
|---|---|---|---|---|---|---|
| Metal | 1 L/min | 3 L/min | 6 L/min | 10 L/min | 20 L/min | 6 L/min |
| Fe | 3.7 | 3.6 | 20.4 | 24.2 | 22.3 | 15.4 |
| Cr | 5.6 | 4.1 | 5.8 | 8.9 | 11.5 | 21.1 |

TABLE 2-continued

| Amount of Metal | Back Shield Gas Flow rate | | | | | Standard Welding Flow Rate |
|---|---|---|---|---|---|---|
| | 1 L/min | 3 L/min | 6 L/min | 10 L/min | 20 L/min | 6 L/min |
| Ni | 0.3 | 0.3 | 0.1 | 0.4 | 0.4 | 0.6 |
| Mn | 0.3 | 0.4 | 1.0 | 1.4 | 1.3 | 2.4 |

(The units are ×10$^{10}$ atom/cm$^2$)

From Table 2, it can be seen that when the flow rate is increased, the amount of metal deposited on the silicon wafer is increased, and the contamination of the inner surface of the pipe is prevented. There is almost no change when the flow rate is increased to a level of greater than 10 L/min, and it is thus presumed that the optimal flow rate for the back shield gas is within a range of 6 L/min–10 L/min.

Embodiment 3

An austenitic stainless steel tube having a diameter of ¼ inch was prepared, and this was subjected to fluoride passivation treatment to a thickness of approximately 200 nm.

The formation of the fluoride passivated film was conducted in the following manner.

The inner surface of the tube was subjected to electropolishing, and the surface roughness was set to an Rmax of 0.7 micrometers. After electropolishing, this was maintained for a period of 10 hours at a temperature of 350° C. in a 100% nitrogen gas atmosphere with a moisture concentration of 10 ppb or less.

Next, this was maintained for a period of 80 minutes at 220° C. in a 100% fluorine gas atmosphere to produce a fluoride passivated film.

After this, the tube was subjected to treatment for a period of 10 hours at a temperature of 300° C. in a 100% nitrogen gas atmosphere with a moisture concentration of 10 ppb or less.

Such tubes were immersed in the variety of chemical solutions shown in Table 3, and the results thereof are shown in Table 3.

Generally, pipes on which 200 nm thick fluoride passivated film has been formed appear greenish; in the table, the circle indicates the disappearance of this color on visual inspection while the x symbol indicates that there was no change.

TABLE 3

| Aqueous Solution | Concentration | Immersion Period | Results of the Observation |
|---|---|---|---|
| NaOH | 1 mol/L | 5 min. | X |
| NH$_4$OH | 1 mol/L | 5 min. | X |
| HF | 1 mol/L | 5 min. | X |
| H$_2$SO$_4$ | 1 mol/L | 5 min. | X |
| Electrolytic Anode Water, pH 6 | | 5 min. | X |
| Electrolytic Cathode Water, pH 10 (NH$_3$ added) | | 5 min. | X |
| Ultrapure water (25° C.) | | 5 min. | X |
| Ultrapure water (80° C.) | | 5 min. | ○ |
| HNO$_3$ | 1 mol/L | 5 min. | X |
| NaNO$_3$ | 1 mol/L | 5 min. | X |
| HNO$_3$ | 1 mol/L | 5 min. | X |
| Na$_2$SO$_4$ | 1 mol/L | 5 min. | X |
| (NH$_4$)NO$_3$ | 1 mol/L | 5 min. | X |
| (NH$_4$)$_2$SO$_4$ | 1 mol/L | 5 min. | X |
| NaCl | 1 mol/L | 5 min. | X |
| FPM, 0.5% HF, 10% H$_2$O$_2$ | | 10 min. | ○ |

It can be seen from Table 3 that the only chemical solutions which were able to remove the fluoride passivated films were hot water at a temperature of 80° C. and a mixed aqueous solution of hydrofluoric acid and hydrogen peroxide.

After welding the various tubes, fluoride passivation retreatment was conducted, and the generation of particles and dust was assessed; the amount of particles and dust generated was dramatically reduced in the cases marked with a circle in Table 3 in comparison with those cases marked with an x.

Embodiment 4

The formation of the fluoride passivated film in this embodiment was identical to that in embodiment 3.

Figure 6:
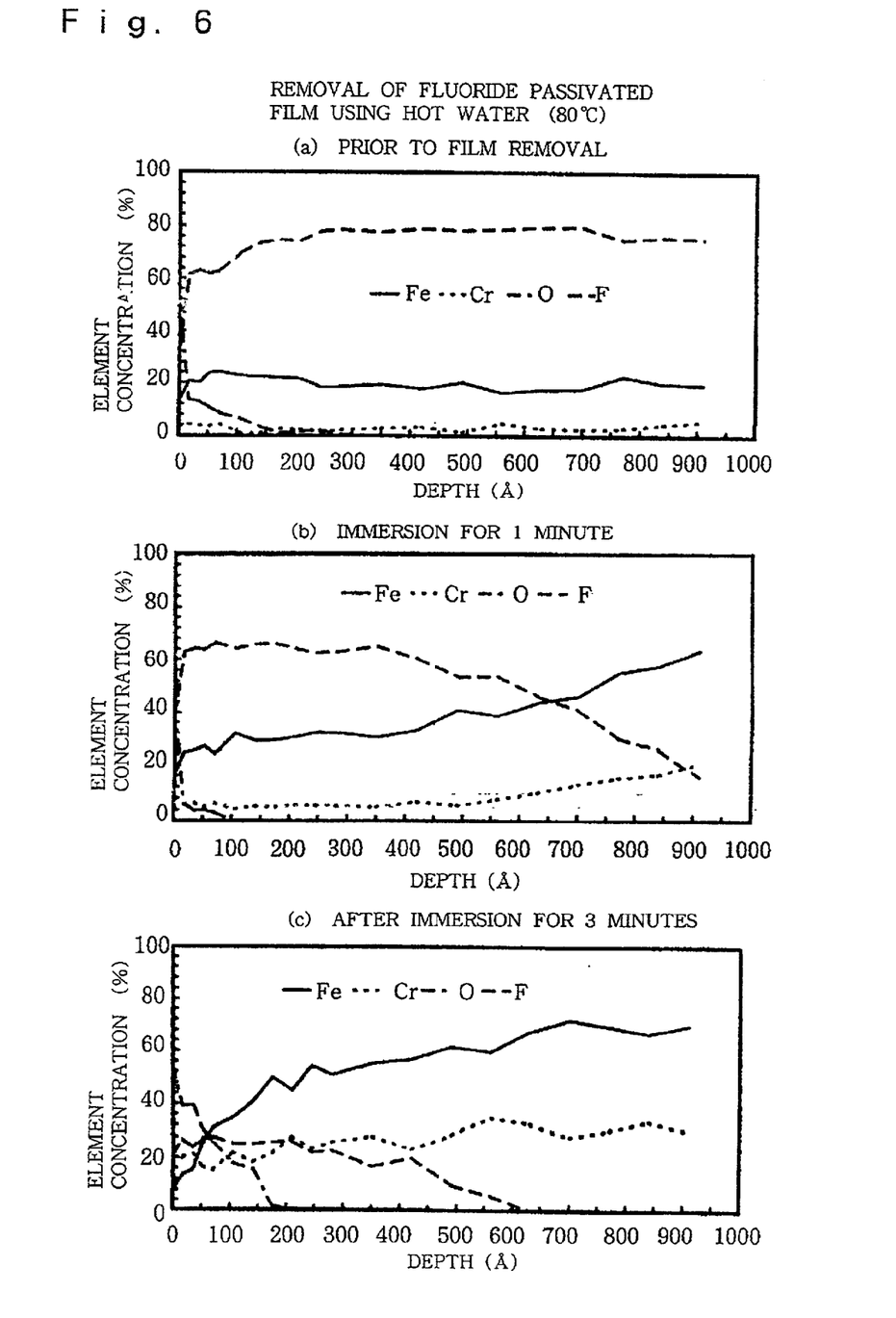
FIG. 6 is a diagram indicating the changes over time in the composition when piping subjected to fluoride passivation treatment is immersed in hot water (80° C.).
Figure 7:
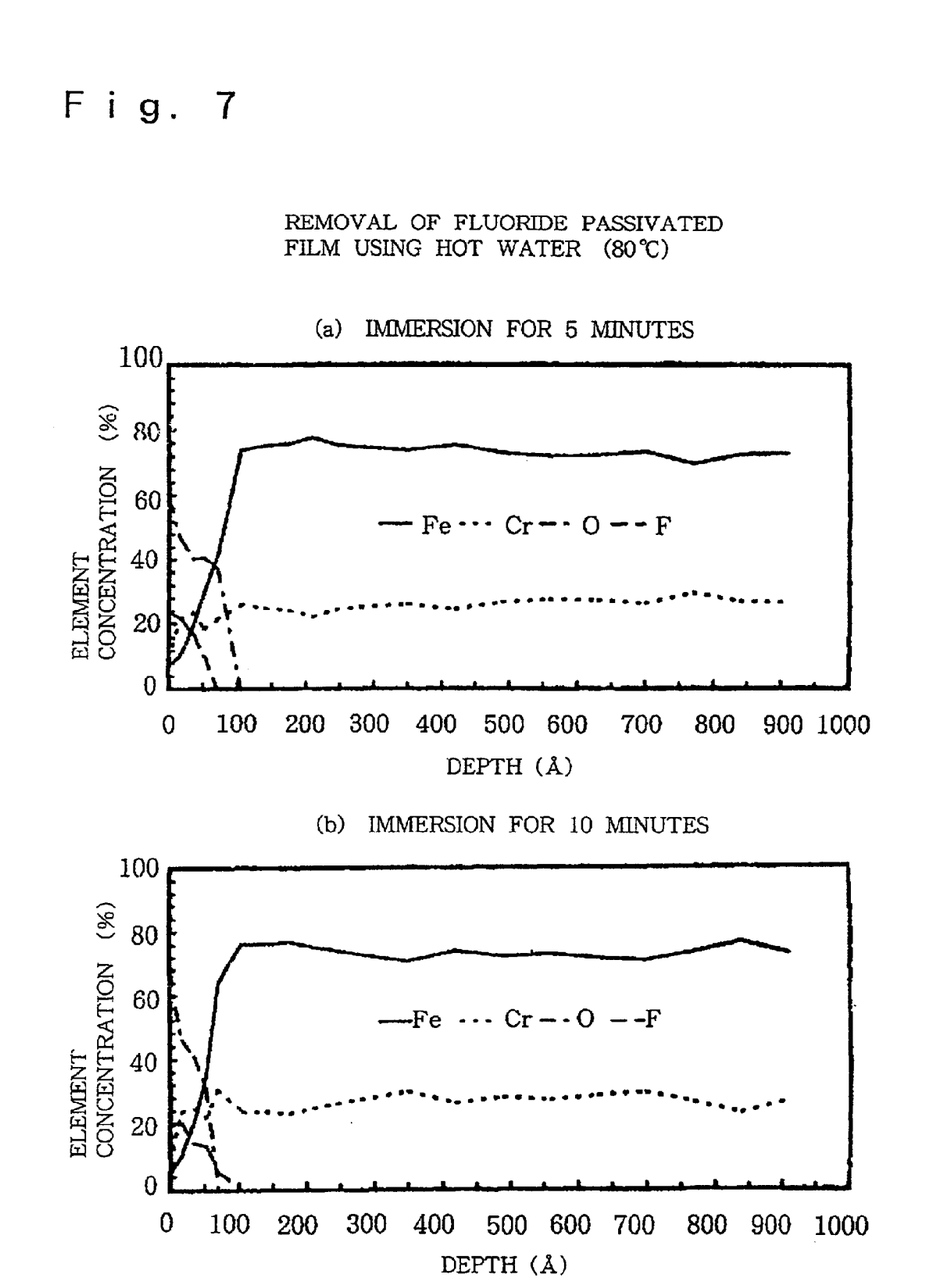
FIG. 7 is a diagram showing the changes over time of the composition when piping subjected to fluoride passivation treatment is immersed in hot water (80° C.).

A sample, comprising a austenitic stainless steel tube having a diameter of ¼ inch on which was formed a fluoride passivated film having a thickness of approximately 200 nm, was immersed in hot water having a temperature of 80° C. and was assayed using photoelectronic spectroscopy using an ESCA-1000S produced by Shimazu Seisakujo (FIGS. 6 and 7).

It can be seen from FIGS. 6 and 7 that as a result of immersion for 5 minutes, almost no fluorine was detected on the surface, and this remains unchanged even after immersion for a period of 10 minutes.

Figure 8:
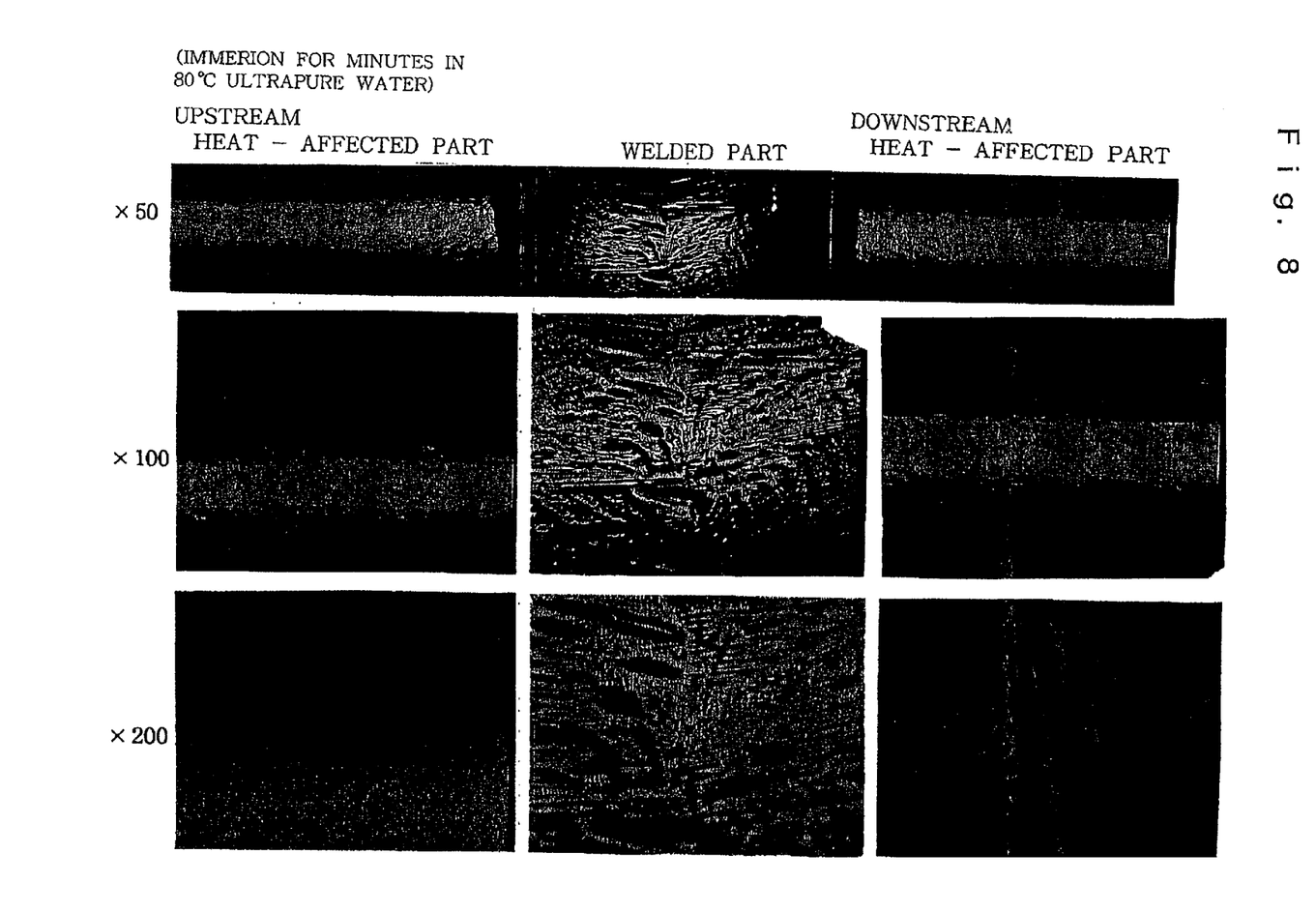
FIG. 8 is a diagram showing an observation, using optical microscopy, of the vicinity of the welded part when the welding of piping subjected to fluoride passivation treatment is conducted after the removal of the fluoride passivated film using hot water (80° C.).

The pipes which had been immersed for a period of 5 minutes were welded, and when the vicinity of the welded part was observed using optical microscopy, no surface roughness was observed (FIG. 8), and by means of this, it can be seen that even if approximately 10 nm of fluorine remains on the surface, there is no effect in the welding.

It can be seen from this that the optimum immersion period is within a range of 5–10 minutes.

Embodiment 5

Figure 9:
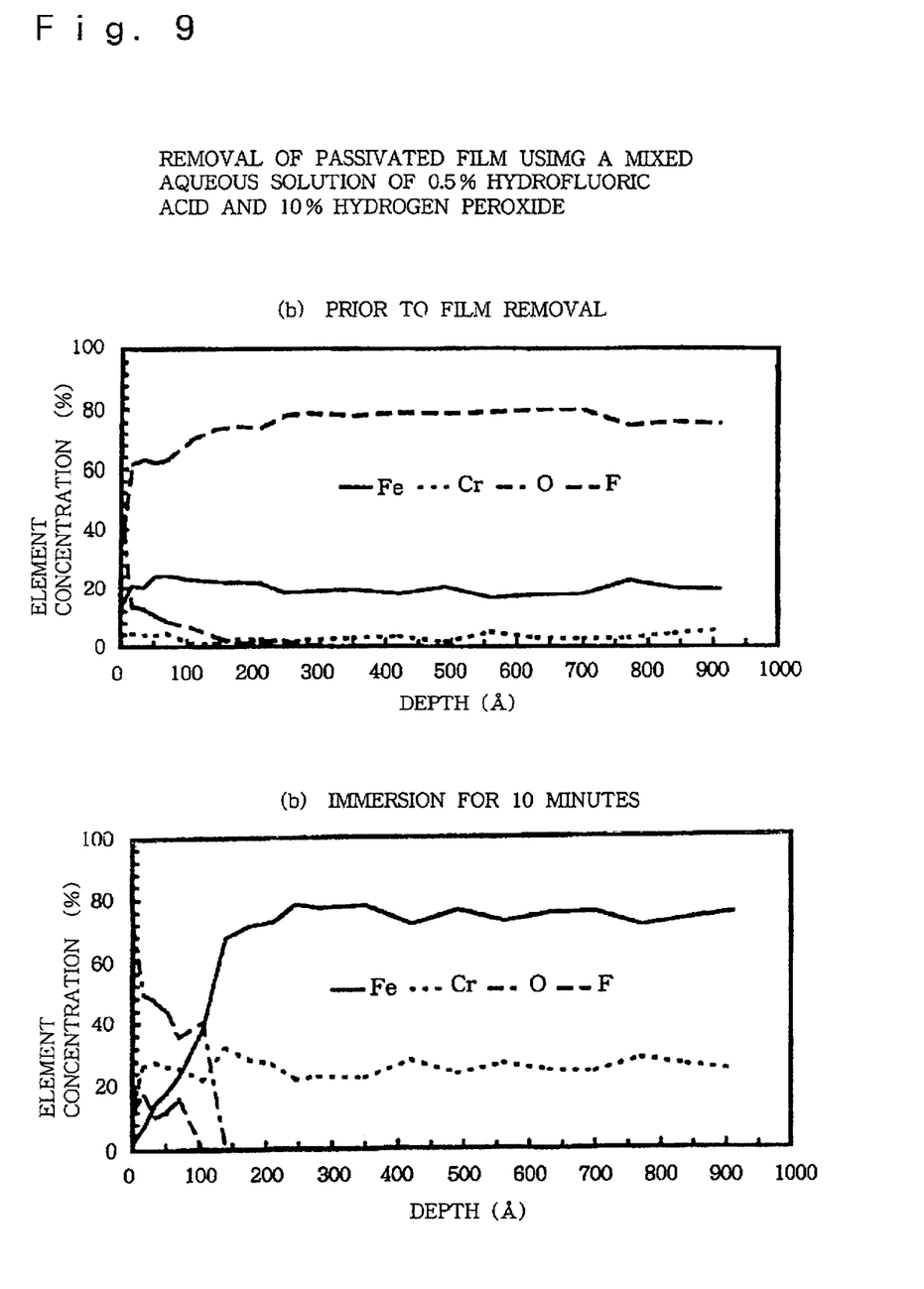
FIG. 9 is a diagram showing the changes over time in the composition when piping subjected to fluoride passivation treatment is immersed in a mixed aqueous solution of hydrofluoric acid and hydrogen peroxide.
Figure 10:
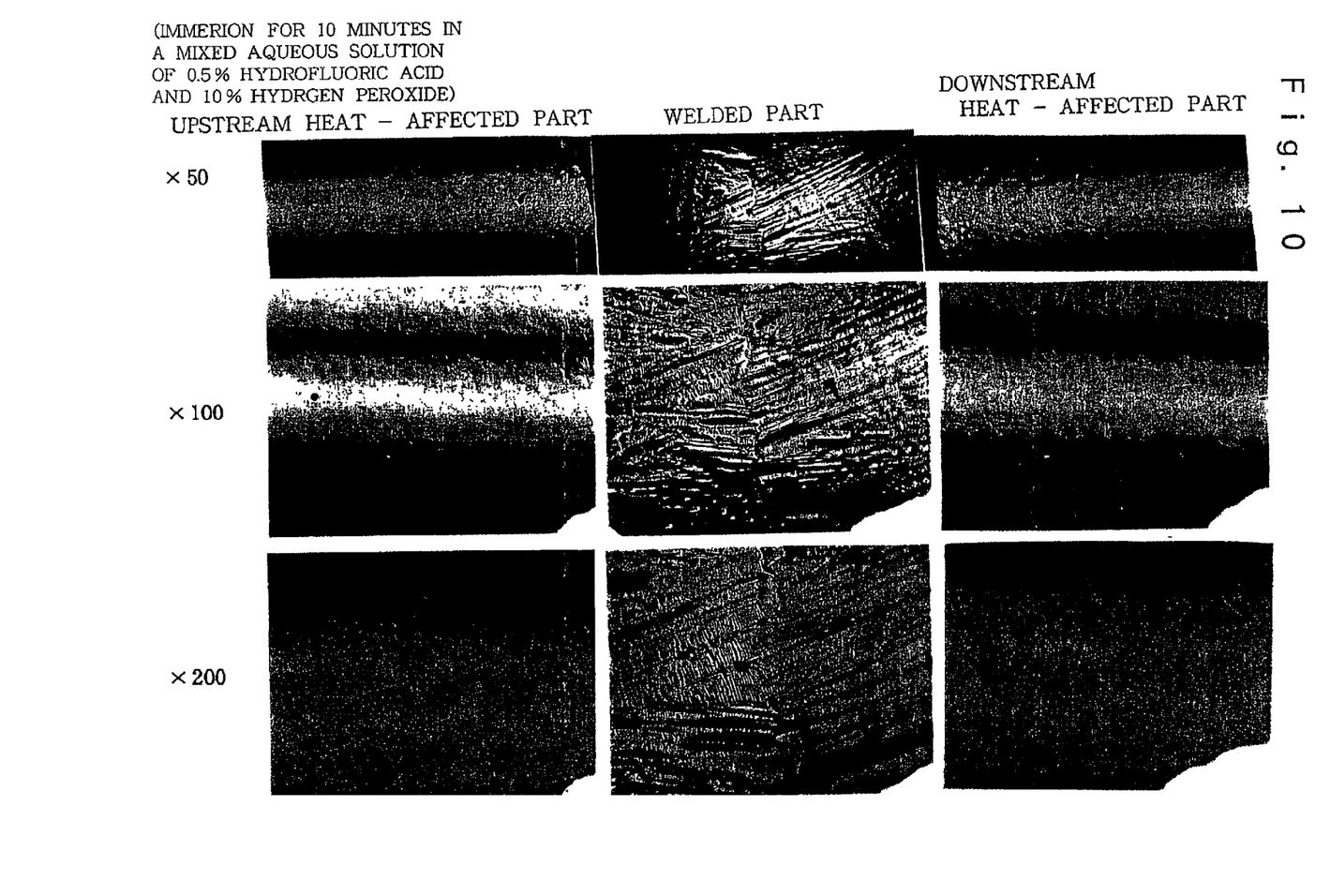
FIG. 10 is a diagram showing an observation, using optical microscopy, of the vicinity of the welded part when the welding of piping subjected to fluoride passivation treatment is conducted after the removal of the fluoride passivated film using a mixed aqueous solution of hydrofluoric acid and hydrogen peroxide.

In the same manner as embodiment 4, immersion was conducted for a period of 10 minutes in an aqueous solution to which 0.5% of hydrofluoric acid and 10% of hydrogen peroxide had been added, and this was assayed (FIG. 9). Using this piping, welding was conducted, and when the vicinity of the wedded part was observed using optical microscopy, absolutely no surface roughness was observed (FIG. 10).

Embodiment 6

Piping comprising stainless steel tubing having a diameter of ¼ inch which was subjected to fluoride passivation treatment and which was welded using standard welding methods, similar piping which was welded with the addition of hydrogen, and piping which was welded after the removal of the passivated oxide film were subjected to a particle assay within the piping using the HIGH PRESSURE GAS PROBE 101 produced by Particle Measuring Systems Inc. (FIG. 3).

9 welding points were employed, the flow rate was 0.1 cf/min, and the diameter of the measured particles was 0.1 micrometers.

The measurement period was 10 minutes.

In the conventional welding method, when hammering was conducted, 60 particles were detected; however, no particles were detected at the welded parts in accordance with the present invention.

From this, it can be seen that by means of the welding technology in accordance with the present invention, it is possible to supply a piping system for use in semiconductor manufacturing lines.

Embodiment 7

Figure 11:
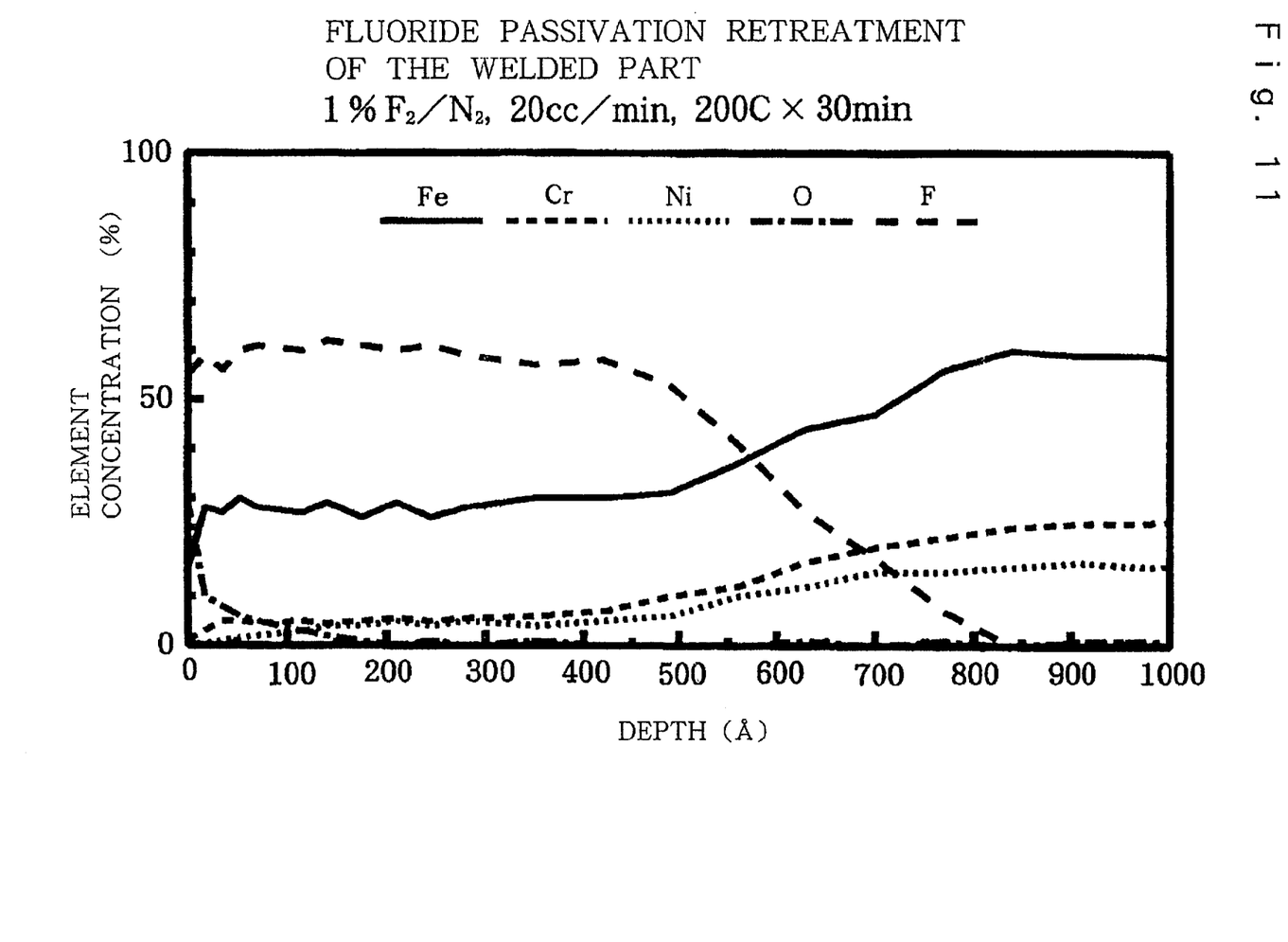
FIG. 11 is a diagram showing the results of the assessment, using photoelectronic spectral analysis, of a welded part which was subjected to fluoride passivation retreatment after welding.

After welding, nitrogen gas containing 1% fluorine was caused to flow through piping from which the passivated oxide film had been removed, at a flow rate of 20 cc/min, and at a temperature of 200° C., and when the welded parts were subjected to a photoelectronic spectral analysis, it was determined that a fluoride passivated film having a thickness of approximately 50 nm was formed (FIG. 11).

Embodiment 8

Austenitic stainless steel tubes having a length of 12 cm and a diameter of ¼ inch were prepared.

The inner surfaces of these tubes were subjected to electropolishing, and the surface roughness thereof was set to an Rmax of 0.7 micrometers. After electropolishing, these were maintained for a period of 10 hours at a temperature of 250° C. in a 100% nitrogen gas atmosphere having a moisture concentration of 10 ppb or less.

Next, these were kept for a period of 3 hours at a temperature of 150° C. in an atmosphere of 1% fluorine gas in nitrogen gas, and a fluoride passivated film was formed.

Subsequently, treatment was conducted for a period of 10 hours at a temperature of 200° C. in an atmosphere of 100% nitrogen gas having a moisture concentration of 10 ppb or less.

By means of the treatment described above, a fluoride passivated film having a thickness of approximately 20 nm was formed on the inner surfaces. These pipes were subjected to butt welding at a welding rotational speed of 30 rpm, and at positions 2 cm from the welded pipes (14 cm from the welded parts), a back shield gas was sprayed onto silicon wafers (at 6 L/min (FIG. 4).

At this time, the hydrogen concentration in the back shield gas was altered as shown in Table 1. Using the TREX 610 produced by the TECNOS Corp., the amount of metallic contaminants during welding was assayed using total reflection fluorescent X-ray spectroscopy, and the results thereof are shown in Table 4.

TABLE 4

| Amount of Metal | Hydrogen Concentration | | | | | Standard Welding Hydrogen Concentration |
|---|---|---|---|---|---|---|
| | 0% | 0.1% | 0.3% | 0.5% | 1% | 5% |
| Fe | 130.5 | 120.2 | 105.3 | 116.8 | 98.7 | 13.2 |
| Cr | 23.4 | 24.3 | 20.6 | 21.3 | 22.5 | 20.3 |
| Ni | 0.5 | 0.1 | 0.3 | 0.2 | 0.3 | 0.5 |
| Mn | 2.5 | 2.3 | 2.1 | 2.4 | 2.5 | 2.3 |

(The units are $\times 10^{10}$ atom/cm$^2$)

In Table 4, the sample indicated by "standard welding hydrogen concentration 5%" indicates a welding member which was electropolished and on which no fluoride passivated film was formed.

Figure 12:
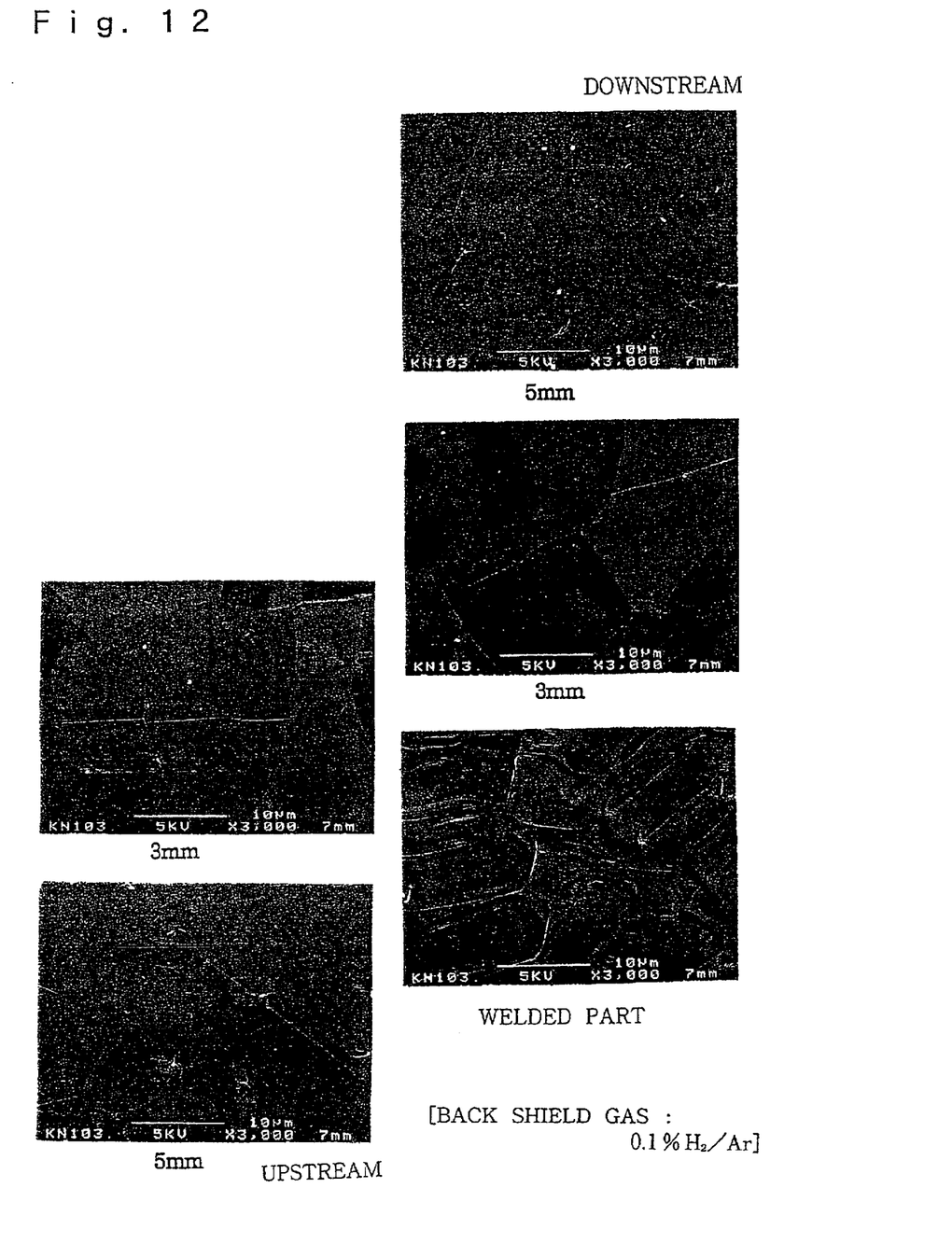
FIG. 12 is a diagram showing an observation, using scanning electron microscopy, of the vicinity of the welded part when the welding of piping subjected to fluoride passivation treatment is conducted with the addition of 0.1% of hydrogen.
Figure 13:
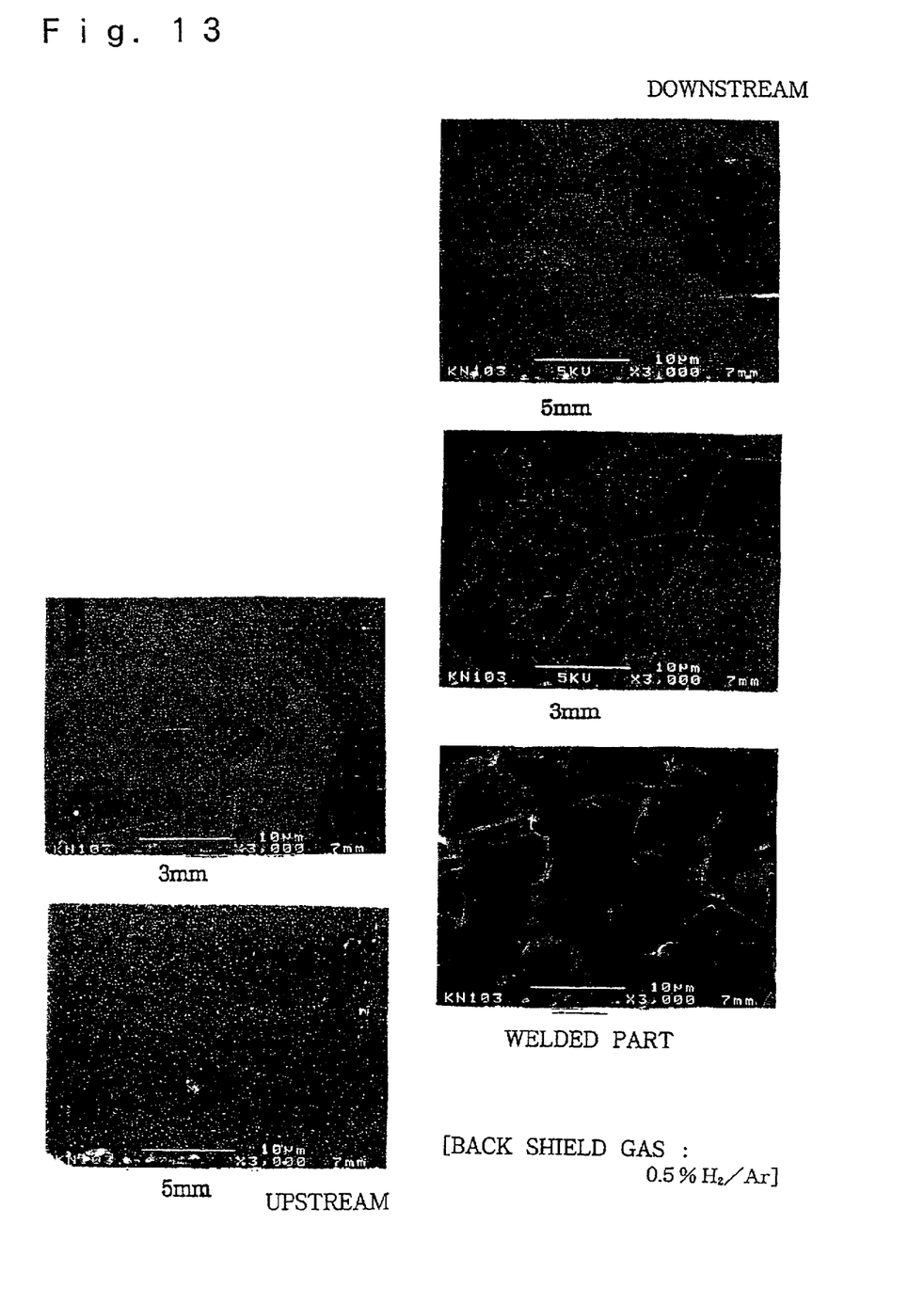
FIG. 13 is a diagram showing an observation, using scanning electron microscopy, of the vicinity of the welded part when the welding of piping subjected to fluoride passivation treatment is conducted with the addition of 0.5% of hydrogen.

Furthermore, the vicinity of the welded part was observed using scanning electron microscopy after welding, and as a result of adding 0.1% or more of hydrogen, almost no deposited materials were observed. Furthermore, there was no surface roughness (FIGS. 12, 13).

After welding, fluoride passivation treatment was conducted under conditions identical to those of the initial fluoride passivated film formation, and when the occurrence of particles and dust was investigated, no particles or dust were detected.

What is claimed is:

1. A welded product produced using a welding method for materials to be welded which are subjected to fluoride passivation treatment, wherein, when materials to be welded, comprising the steps of:

adding hydrogen to a gas (back shield gas) flowing through the materials to be welded; and welding stainless steel which is subjected to fluoride passivation treatment.

2. The welded product of claim 1, the welding method used to produce the welded product further comprising the step of:

heating at least the welded Part after welding and flowing a gas containing fluorine gas through the interior of said parts.

3. A welding product produced using a welding method for materials to be welded which are subjected to a fluoride passivation treatment, comprising the steps of:

supplying stainless steel subjected to fluoride passivation treatment wherein the thickness of a fluoride passivated film in a prespecified range from butt end surfaces of members to be welded is set to 10 nm or less; and welding stainless steel.

4. The welding product of claim 3, the welding method used to produce the welding product further comprising the step of:

immersing a region of at least 5 mm from said butt end surfaces of said materials to be welded in an aqueous solution containing hydrofluoric acid and hydrogen peroxide, welding being subsequently conducted relative to said step of immersing.

5. The welded product of claim 3, the welding method used to produce the welded product further comprising the step of:

immersing a region of at least 5 mm from said butt end surfaces of said materials to be welded for a period of 5 minutes or more in hot water within a range of 60–90° C. removing a film, said step of welding being subsequently conducted upon removing said film.

6. The welded product of claim 3, the welding method used to produce the welded product further comprising the step of:

heating at least the welded part after welding and flowing a gas containing fluorine gas through the interior of said parts.

7. The welded product of claim 4, the welding method used to produce the welded product further comprising the step of:

heating at least the welded part after welding and flowing a gas containing fluorine gas through the interior of said parts.

8. The welded product of claim 5, the welding method used to produce the welded product further comprising the step of:

heating at least the welded part after welding and flowing a gas containing fluorine gas through the interior of said parts.

* * * * *